United States Patent [19]

Dvali et al.

[11] 4,013,884
[45] Mar. 22, 1977

[54] OPTICAL DEVICE FOR A SURFACE VEHICLE GUIDANCE SYSTEM USING A LIGHT-CONTRAST PROGRAMME

[76] Inventors: Rafael Rafaelovich Dvali, ulitsa Barnova, 109; Otar Vladimirovich Margvelashvili, prospekt I. Chavchavadze, 11; Alexei Dmitrievich Nozadze, prospekt Tsereteli, 69; Mikhail Erastovich Burdzgla, ulitsa Atskhurskaya, 4b; Alexandr Nikolaevich Melitauri, ulitsa Barnova, 91, all of Tbilisi, U.S.S.R.

[22] Filed: Oct. 16, 1975

[21] Appl. No.: 622,977

[30] Foreign Application Priority Data

Oct. 24, 1974 U.S.S.R. ............................ 2069995

[52] U.S. Cl. ............................... 250/202; 250/236
[51] Int. Cl.² ....................... G05B 1/00; H01J 3/14
[58] Field of Search ................ 250/202, 203 R, 236

[56] References Cited
UNITED STATES PATENTS

| | | | |
|---|---|---|---|
| 3,614,448 | 10/1971 | Di Prose et al. | 250/202 |
| 3,638,019 | 1/1972 | Desvignes et al. | 250/203 X |
| 3,704,372 | 11/1972 | Parker et al. | 250/202 |
| 3,705,755 | 12/1972 | Baer | 250/236 |

Primary Examiner—Saxfield Chatmon, Jr.
Assistant Examiner—T. N. Grigsby
Attorney, Agent, or Firm—Lackenbach, Lilling & Siegel

[57] ABSTRACT

An optical device comprising an illuminator, a receiver located below the illuminator and a scanner. The scanner is designed as two identical mirror prisms rigidly coupled to each other and rotatably mounted on a common axle. One of the prisms intercepts the light beams of the illuminator. The other prism is placed below the former so that it intercepts the light beams reflected from the light-contrast pattern bearing surface being explored and directed to the receiver. A gap is provided between the mirror prisms which accommodates a partition made of a light-tight material. The casing is provided with two viewing windows which correspond to said mirror prisms. The above design of the scanner makes it possible to use the optical device in automatic guidance systems on board vehicles operating under any environmental conditions both in the day-time and at night on various surfaces bearing a light-contrast pattern.

7 Claims, 3 Drawing Figures

OPTICAL DEVICE FOR A SURFACE VEHICLE GUIDANCE SYSTEM USING A LIGHT-CONTRAST PROGRAMME

The present invention relates to means for automating the operation of surface vehicles, and in particular to an optical device for an automatic system which guides a vehicle in accordance with a light-contrast pattern.

The invention can be used in automatic guidance systems installed on mobile vehicles performing various functions, for instance, tilling land, harvesting crops, building roads or transporting loads.

The proposed optical device can be used, for instance, to automatically guide a car, a tractor, a combine, a road-building machine or any other mobile implement. Besides, the device can be used not only for guiding the vehicle as a whole but also for controlling the movements of a part thereof, for instance, a tool or a techological means. Moreover, it is possible to use the device for the automatic control of stationary objects when a mobile light-contrast pattern is the source of control signals.

The invention makes it possible to improve automatic control systems in which scanning means are used to analyze the surface being explored. In this case, the surface should bear the light-contrast pattern which serves as a course of control signals for the automatic system.

The light-contrast pattern can be derived both from natural and from artificial objects on the surface being explored. A natural light-contrast pattern is considered to be one formed in the course of performing ordinary technological operations without resorting to special light-contrast substances or objects. For instance, a natural light-contrast pattern will be generated when a field is ploughed after the grain crop has been harvested. The pattern, in this case, is the boundary between the ploughed and the unploughed parts of the field. A row of plants, a row of mown down crop, or a boundary between the mown and the unmown areas can also serve as components of the light-contrast patterns. The natural light-contrast pattern would, in general, be formed right after a respective implement has completed its first run. During successive runs, the pattern would serve as the source of guidance signals for the automatic control system of the vehicle.

An artificial light-contrast pattern is considered to be one formed with the use of special substances (powders, granules, foams, etc.) or objects (ribbons, cords, strings of floats, etc.) which product a light contrast with respect to the surface being explored. Such substances or objects, when placed on the surface being explored (a field, a road, a patch of water, etc.), can preset the required path for a vehicle or a sequence of operations to be performed by an implement.

Present automatic control systems intended to guide vehicles in accordance with a light-contrast pattern when the vehicle and the surface being explored move with respect to each other, use various optical devices.

Known in the art is an optical device (cf. USSR Inventor's Certificate No. 169,303) which comprises a scanner and a receiver of light beams reflected from the light-contrast pattern bearing surface. The scanner is designed as a flat mirror rotatably mounted on an axle with a skew with respect to the light-contrast pattern bearing surface which can rotate. The receiver is designed as an object glass placed in the path of the reflected light beams and comprises a photodiode which serves as its sensing element. The device is provided also with a reference signal setter made as a disc with a hole. The disc is rigidly coupled with the mirror. Facing one side of the disc is the photodiode and the other, an incandescent lamp.

In another optical device (cf. USSR Inventor's Certificate No. 209,096), the scanner is designed as a hexagonal prism rotatably mounted on an axle. Three facets of the prism are made as spherical mirrors which alternate with three of the prisms's facets provided with holes. The receiver is this device is designed around a photodiode located in the center of said hexagonal prism. The setter of reference signals is made as a disc having three holes equidistantly spaced along its circumference. The disc is rigidly coupled with the prism. Facing one side of the disc is the photodiode and the other, an incandescent lamp.

The above optical devices operate only in the daytime At night, they are rendered useless since the level of illumination of the light-contrast pattern bearing surface becomes too low.

Also known is an optical device (cf. USSR Inventor's Certificate No. 470,263) comprising an illuminator, a scanner, and a light beam receiver located in a casing.

The receiver and the illuminator are placed opposite each other and mounted in a tilted manner with respect to the surface being explored at the same angle. The scanner is located between the receiver and the illuminator. It is made as a tetrahedral mirror prism. The prism is installed in the casing in the path of light beams produced by the illuminator. It is rotatably mounted on an axle. One of the facets of the prism faces the stationary illuminator and the adjacent facet faces the receiver. Owing to this arrangement, the viewing window in the casing makes it possible to successively illuminate the surface being explored and to simultaneously receive the light beams reflected therefrom.

The receiver comprises an object glass and a photoelectronic multiplier. The receiver is intended to convert the reflected light beams into an electrical signal carrying the information on the position of the vehicle with respect to the surface being explored. This signal is compared with those produced by a setter of reference signals. The latter is made as a disc having bulges arranged along its circumference at equal distances from one an other. The number of bulges is equal to that of the mirror prism facets, of which there are four. The disc is rigidly coupled with the mirror prism. Besides, the setter is provided with two inductance-type sensors fixed in the casing.

When the devices described above are used in systems for automatic guidance of such vehicles as agricultural implements or road construction machines in fields, open-cut mines or open roads, they have to be sealed, to which end a protection glass is placed in the viewing window.

In case it is required that the spectrum of the light flux should be changed so as to take account of the reflection properties of the surface being explored, a light filter is installed in the viewing window.

In all the above devices, the light beams produced by the illuminator strike the mirror prism and pass via the protection glass or the filter towards the surface being explored, and in doing so they are partially reflected from the working facets of these components and arrive at the sensing element of the receiver making it produce spurious signals at its output. Due to this effect in the day-time, the performance of the device is seriously affected while at night the latter cannot be used at all.

It is an object of the present invention to provide an optical device would could operate under any environment both in the day-time and at night.

Another object of the present invention is to make is possible to introduce required changes in the spectrum composition of the light flux reflected from the surface being explored.

These objects are achieved in that an optical device used in the automatic control system guiding a surface vehicle in accordance with a light-contrast pattern when said vehicle moves along the light-contrast pattern bearing surface being explored, comprises an illuminator placed in a casing and produces a bunch of light beams in the path of which there is a scanner rotatably mounted in said casing on an axle and intended to successively illuminate the light-contrast pattern bearing surface being explored through a viewing window made in said casing and to simultaneously bring the light beams reflected from said surface to a receiver installed in the path of these beams and serving to convert them into an electrical signal carrying the information on the position of the vehicle with respect to the surface being explored, which is compared with signals generated by a reference signal setter rigidly coupled with said scanner. According the invention, said scanner is made as two identical rigidly coupled mirror prisms mounted on a common axle to form a gap accommodating a partition of a light-tight material, one prism being placed in the path of the light beams of said illuminator and intended to successively illuminate the surface being explored and the other prism being placed in the path of the light beams reflected from the surface being explored and intended to bring said means to said receiver, while the casing is provided with a complementary viewing window which, in conjunction with said primary viewing window, ensures that the light beams of the illuminator and those reflected from the surface being explored pass through separate channels.

The above device can be used in automatic guidance systems for vehicles operating under any environmental conditions both in the day-time and at night. This is made possible by so designing the scanner that the light beams reflected from the mirror prism placed in the path of light beams of the illuminator are partially reflected from the protection glass or the filter in the viewing window but are prevented from arriving at the sensing element of the receiver. The sensing element of the receiver is affected only by those light beams that have been reflected from the surface being explored and have passed through the second viewing window.

Thus, it becomes possible to protect the viewing window with a glass to seal the device when the vehicle operates under various environmental conditions (in a field, in an open-cut mine, on a road, etc.) without degrading its performance both in the day-time and at night.

Besides, the above design of the optical device makes it possible to introduce required changes in the spectrum composition of the light flux reflected from the surface being explored. To this end, various light filters are used which are selected in accordance with the reflecting properties of the surface being explored and the spectrum of the light source. These filters are installed in the viewing windows. The use of the light filters and protection glasses placed in the viewing windows does not produce any spurious signals at the receiver output, nor does it degrade the performande of the optical device due to the above reasons.

These and other objects of the present invention will become more apparent from the following description of its embodiments given by way of example with reference to the accompanying drawings in which.

Figure 1:
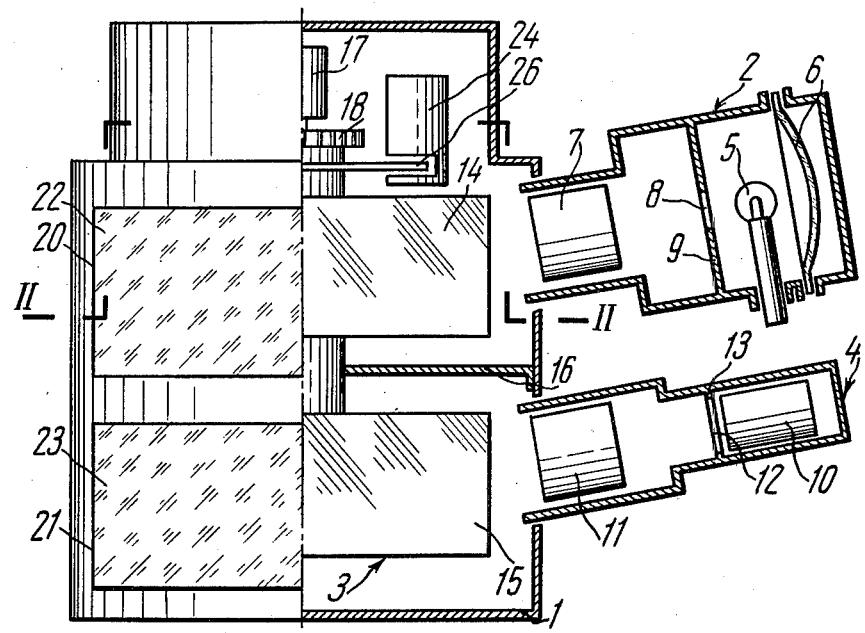
FIG. 1 shows an optical device for a surface vehicle guidance system using a light-contrast pattern, accordance to the invention, with a partial cut-out.

The optical device for a surface vehicle guidance system using a light-contrast pattern comprises a casing 1 (FIG. 1) containing an illuminator 2, a scanner 3 and a receiver 4 of of light beams reflected from the surface being explored.

The illuminator 2 comprises a light source made as an incandescent lamp 5, and a counter-reflector made as a spherical mirror 6. Intercepting the light beams of the lamp 5 is an object glass 7. In order to obtain a sharp light spot on the illuminated light-contrast pattern bearing surface (not shown) an iris is installed between the lamp 5 and the object glass 7. The iris is designed as a circular aperture 8 made in a partition 9.

The receiver 4 is located in the casing 1 below the illuminator 2. It comprises a sensing element built around a photomultiplier 10 and an object glass 11 located in front of the multiplier. Placed between the photomultiplier 10 and the object glass 11 is another iris designed as a slot 12 in a partition 13. This iris is intended to limit the area which is illuminated at a given instant on the surface being explored.

The illuminator 2 and the receiver 4 are installed so that they make the same angle to the surface being explored.

The scanner 3 comprises two identical tetragonal prisms 14 and 15 made as a single unit and mounted on an axle so that they can rotate. The prism 14 is installed in front of the object lens 7 of the illuminator 2. It intercepts the light beams produced by the illuminator 2 and serves to successively illuminate the light-contrast pattern bearing surface being explored.

The prism 15 is installed below the prism 14 in front of the object glass 11 of the receiver 14. It intercepts the light beams reflected from the surface being explored and serves to direct these beams to the receiver 4.

Figure 2:
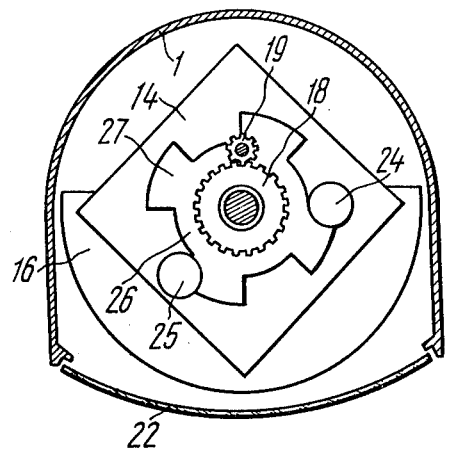
FIG. 2 shows a cross section of the optical device of FIG. 1, cut along II — II.

A gap between the prisms 14 and 15 accommodates a partition made as a metal semi-disc 16 (FIG. 2). The prism 14 is coupled with an electric motor 17 (FIG. 1) via gears 18 and 19 (FIG. 2).

The casing 1 has viewing windows 20 and 21 made opposite the prisms 14 and 15 respectively (FIG. 1). Installed in these windows are protection glasses 22 and 23. The prisms 14 and 15 separated by the semi-disc 16 and the protection windows 20 and 21 ensure that there are two independent light beam channels: one is for the beams passing from the illuminator 2 to the surface being explored and the other is for the beams reflected from this surface and arriving to the receiver 4. The protection windows 22 and 23 seal the device and ensure its proper performance irrespective of the environmental conditions.

The protection glasses 22 and 23 in the viewing windows 20 and 21 may be substituted by light filters (not shown). The use of light filters makes it possible to introduce changes in the spectrum composition of the light flux reflected from the surface being explored and thus take into account the peculiarities of the reflection properties of the given surface.

The illuminator 2, the receiver 4 and the scanner 3 form a sensor whose output carries the information on the position of the vehicle with respect to the light-contrast pattern bearing surface.

The device is provided also with a setter of reference signals which are compared with the signals at the sensor output.

The setter of reference signals comprises two inductance-type sensors 24 and 25 (FIG. 2) of known designs which are secured on the walls of the casing 1 at an angle with respect to each other. In addition to the inductance-type sensors 24 and 25, the setter is provided with a disc 26 having bulges 27 spaced around its circumference at equal intervals. The number of bulges is equal to that of the facets of the mirror prisms 14 and 15, of which there are four. The disc 26 is rigidly coupled with the mirror prism 14. This coupled ensures that the receiver sensor and the setter of reference signals operate in synchronism. Besides, it simplifies the adjustment of the optical device.

Figure 3:
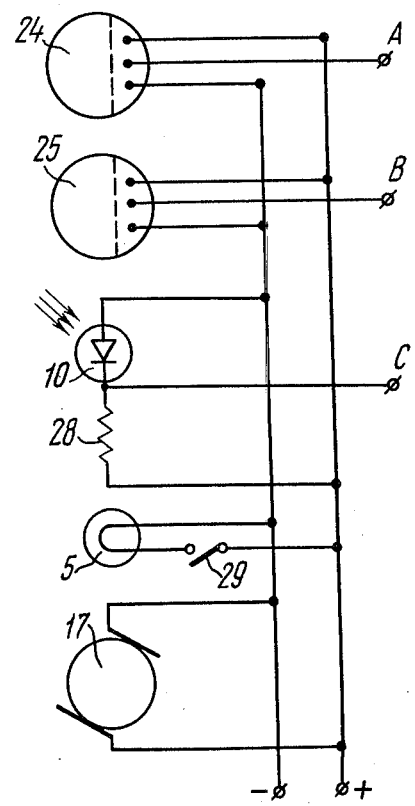
FIG. 3 is a schematic of the optical device, according to the invention.

The optical device elements 5, 10, 17, 24 and 25 described above form an electrical circuit represented in FIG. 3. The inductance-type sensors 24, 25, the photomultiplier 10, the incandescent lamp 5 and the motor 17 are connected in parallel and energized by a common power supply (not shown).

Connected in series to the photomultiplier 10 is a resistor 28, and the supply network of the incandescent lamp 5 comprises a switch 29 connected in series with the lamp. The switch is used to energize the lamp 5 when the vehicle operates on a poorly illuminated surface.

The output signals of the inductance-type sensors 24 and 25 and the photomultiplier 10 are picked off points A, B and C, respectively.

The optical device for the surface vehicle guidance system using a light-contrast pattern operates as follows.

On being energized the motor 17 (FIG. 1) starts rotating and rotates, via the gears 18 and 19 (FIG. 2), the mirror prisms 14 and 15 (FIG. 1) and the disc 26 with the bulges 27 (FIG. 2). The light flux produced by the incandescent lamp 5 (FIG. 1) is shaped into a beam by the aperture 8 and the object glass 7 and, on reflection from a facet of the mirror prism 14, passes through the protection glass 22 or through a light filter to scan the light-contrast patern bearing surface being explored. The light beams which have been partially reflected from the protection glass 22 in this case cannot arrive at the photomultiplier 10 and hence, no spurious signals appear at its output. This is the result of the design of the mirror prisms 14 and 15 described above which are separated by the partition 16 made of a light-tight material, as well as of the position of the illuminator 2 and the receiver 4.

The light flux reflected from the surface being explored passes through the protection glass 23 or through a light filter and strikes a facet of the mirror prism 15 which reflects it onto the object glass 12 and the slot 12. The latter project the light flux onto the photomultiplier 10.

The result is that point C (FIG. 3) develops a potential the magnitude whereof will depend on the brightness of the surface being explored. The difference in brightness of light-contrast areas of the surface being explored causes jumps in the voltage in the load network of the photomultiplier 10 which appears at the moments when the optical axis of the device crosses the boundary between two light-contrast areas of the surface, for instance, the boundary between the ploughed and unploughed areas of a field.

The prisms 14 and 15 (FIG. 1) rotate in synchronism with the disc 26 having bulges 27 (FIG. 2). So when the bulges 27 of the disc 26 pass through grooves of the inductance-type sensors 24 and 25 the latter produce reference signals to be picked off points A (FIG. 3) and B. (One revolution of the prisms 14 and 15 and the disc 26 produces four signals at points A, B, C).

If the signal picked off point C of the photomultiplier 10 appears at the moment corresponding to the interval between reference signals picked off points A and B it will mean that the guided vehicle is stationed correctly with respect to the boundary line between the light-contrast areas of the surface. If the signal at the output of the photomultiplier 10 appears before the signals of the inductance-type sensors 24, 25 or lags behind them, this will mean that the vehicle has drifted to one or to the other side of the boundary line between the light-contrast areas.

The optical device described above is to be installed on board the vehicle equipped with the automatic guidance system and adjusted before the latter is put in to operation. The adjustment procedure consists in that the vehicle is positioned at the required distance from the boundary line between the light-contrast areas and the device is adjusted so that the output signal of the receiver 4 (FIG. 1) picked off point C (FIG. 3) will appear at a moment coinciding in time to the interval between the reference signals produced by the inductance-type sensors 24 and 25 and picked off points A and B.

The optical device described above may be used advantageously in automatic guidance systems using light-contrast patterns for vehicles operating under any environmental conditions both in the day-time and at night on any surface bearing a light-contrast pattern.

What is claimed is:

1. An optical device for an automatic guidance system using a light-contrast pattern for a vehicle moving along a surface being explored and exhibiting the light contrast pattern, which comprises a casing; two light transmissive windows in said casing; light transmitting means housed in said casing for generating an outgoing beam of light for illuminating said surface being exposed; light receiving means housed in said casing for receiving incoming light beams reflected from said surface being explored and for converting said incoming light receiving means into electrical signals carrying the information on the position of said vehicle with respect to said surface being explored; scanning means in the nature of two mirror prisms located in said casing, a first mirror prism being placed in the path of said outgoing light beam and being rotatably mounted on an axle and adapted to successively illuminate, via one of said windows, said surface being explored, and the second mirror prism being placed in the path of said incoming light beams reflected from said surface being explored, via the other one of said windows, and being mounted on said axle, said first and second mirror prisms being spaced from each other to form a gap therebetween; partition means provided in said gap between said first and second mirror prisms and made of a substantially opaque material to prevent undesired direct light transmission between said light transmitting and receiving means; and reference signal generating means rigidly coupled to said axle of said mirror prisms for generating reference signals to synchronism with the revolution of said mirror prisms.

2. An optical device as defined in claim 1, wherein said two windows are substantially co-planar.

3. An optical device as defined in claim 1, wherein each of said mirror prisms are tetragonal prisms.

4. An optical device as defined in claim 1, wherein said reference signal generating means comprises at least one stationary detector positioned proximate to the axis of said axle, and movable means mounted on said axle for common rotation with said mirror prisms, said movable means including a plurality of detectable portions corresponding to the number of mirror surfaces of said mirror prisms which detectable portions are successively detected by said stationary detector with rotation of said axle to produce corresponding synchronous signals.

5. An optical device as defined in claim 4, wherein said at least one stationary detector comprises an inductor, said movable means comprises a rotatable disc, and said detectable portions comprise metallic bulges or radial protuberances which successively pass proximate to said at least one inductor.

6. An optical device as defined in claim 1, wherein two stationary detectors are provided and angularly spaced from each other about the axis of said axle.

7. An optical device as defined in claim 1, wherein said windows comprise light transmissive filters to introduce changes in the spectral composition of said incoming light beam reflected from said surface being explored.

* * * * *